United States Patent
Narasimhulu et al.

(10) Patent No.: US 8,463,468 B2
(45) Date of Patent: *Jun. 11, 2013

(54) SYSTEM AND METHOD FOR COMPUTING FLIGHT TIME FROM AN EQUI-DISTANCE POINT TO A REFERENCE POINT

(75) Inventors: Veeresh Kumar Masaru Narasimhulu, Bangalore (IN); Dinesh Kumar Kushwaha, Bangalore (IN)

(73) Assignee: Airbus Engineering Centre India, Bangalore, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/379,667

(22) PCT Filed: Jul. 19, 2010

(86) PCT No.: PCT/IN2010/000479
§ 371 (c)(1),
(2), (4) Date: Dec. 21, 2011

(87) PCT Pub. No.: WO2011/024189
PCT Pub. Date: Mar. 3, 2011

(65) Prior Publication Data
US 2012/0109428 A1    May 3, 2012

(30) Foreign Application Priority Data
Jul. 20, 2009  (IN) .......................... 1713/CHE/2009

(51) Int. Cl.
*G06F 19/00*     (2006.01)

(52) U.S. Cl.
USPC ............. 701/16; 701/120; 701/122; 701/123; 701/301; 701/411; 701/467; 701/528; 701/532; 701/533; 244/175; 244/186; 340/945; 455/66.1; 455/98

(58) Field of Classification Search
USPC ............... 701/3, 4, 8, 10, 11, 13, 15, 16, 120, 701/122, 123, 301, 411, 467, 528, 532, 533; 244/76 R, 175, 186; 340/945; 455/66.1, 98
See application file for complete search history.

(56) References Cited

U.S. PATENT DOCUMENTS

| | | | |
|---|---|---|---|
| 5,270,931 A * | 12/1993 | Appleford ........................ | 701/3 |
| 6,965,816 B2 * | 11/2005 | Walker ............................ | 701/16 |
| 2008/0300739 A1 * | 12/2008 | Coulmeau et al. ................ | 701/8 |
| 2009/0076721 A1 * | 3/2009 | Coulmeau et al. ............ | 701/206 |
| 2009/0082955 A1 * | 3/2009 | Sacle et al. ..................... | 701/206 |
| 2010/0152996 A1 * | 6/2010 | Blanchon et al. ............ | 701/120 |
| 2012/0130564 A1 * | 5/2012 | Narasimhulu et al. ............ | 701/3 |

* cited by examiner

*Primary Examiner* — James Trammell
*Assistant Examiner* — McDieunel Marc
(74) *Attorney, Agent, or Firm* — Prakash Nama; Global IP Services, PLLC

(57) ABSTRACT

A method of a flight management system (FMS) of an aircraft for computing flight time from an equi-distance point (EDP to a reference point for an emergency landing of the aircraft includes receiving at least two reference points for landing the aircraft upon an occurrence of an emergency and determining a remaining flight path for the aircraft based on a current location of the aircraft and a flight plan serviced by the FMS. Further, the method includes generating the EDP for the aircraft by locating a point in the remaining flight path, and calculating an expected flight time of the aircraft from the EDP to each of the at least two reference points based on a plurality of factors affecting the flight time of the aircraft.

20 Claims, 6 Drawing Sheets

SYSTEM AND METHOD FOR COMPUTING FLIGHT TIME FROM AN EQUI-DISTANCE POINT TO A REFERENCE POINT

FIELD OF TECHNOLOGY

The present invention relates to the field of aeronautical engineering. In particular, the present invention relates to a flight management system (FMS).

BACKGROUND

A flight management system (FMS) is a fundamental part of an aircraft which is used to control a navigation of the aircraft. The FMS may hold a flight plan of the aircraft, and allow the pilot to modify the flight plan as required during the flight. The FMS uses various sensors to determine a position of the aircraft. Given the position and the flight plan, the FMS may guide the aircraft along the flight plan or a flight path. The FMS is normally controlled through a small screen and a keyboard. The FMS also may display the flight plan on an electronic flight instrument system (EFIS), navigation display (ND) or multi-function display (MFD). Further, the FMS may compute predicted speed, altitude, fuel consumed along the flight plan, and so on.

An equi-distance point (EDP) may be computed by the FMS to safely navigate the aircraft, where the EDP may provide a point from which the distance to fly to two given reference points (e.g., two airports) is equal. The EDP may act as an advisory for the pilot during emergency situations where an emergency landing may be required. Currently, publicly visible methods for computing such a point appear to use a simplified formula based on many approximations. Thus, there may be room for an error in determining the EDP. Furthermore, the currently available methods, while computing flight time from the EDP to the reference points, may assume the flight as a constant speed flight, and hence leaving a room for an additional error.

SUMMARY

A system and method for computing flight time from an equi-distance point (EDP) to a reference point is disclosed. In one aspect, a method of a flight management system (FMS) of an aircraft for computing flight time from an EDP to a reference point for an emergency landing of the aircraft includes receiving at least two reference points for landing the aircraft upon an occurrence of an emergency. The method also includes determining a remaining flight path for the aircraft based on a current location of the aircraft and a flight plan serviced by the FMS.

Further, the method includes generating the EDP for the aircraft by locating a point in the remaining flight path which is equidistant from the at least two reference points. Then, the method includes calculating an expected flight time of the aircraft from the EDP to each of the at least two reference points based on a plurality of factors affecting the flight time of the aircraft. The expected flight time of the aircraft from the EDP to the each one of the at least two reference points is calculated based on a default flight profile flying a great circle distance.

In another aspect, an article includes a storage medium having instructions, that when executed by a computing platform of an FMS of an aircraft, result in execution of the method described above.

In yet another aspect, a system of an FMS of an aircraft for computing flight time from an EDP to a reference point for an emergency landing of the aircraft includes a processor, and a memory coupled to the processor. The memory is configured for storing a set of instructions, when executed by the processor, causes the processor to perform the method described above.

The methods, systems and apparatuses disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A system and method for computing flight time from an equi-distance point (EDP) to a reference point is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims. It is appreciated that the terms 'expected flight time' and 'flight time' are used interchangeably throughout the document.

Figure 1:
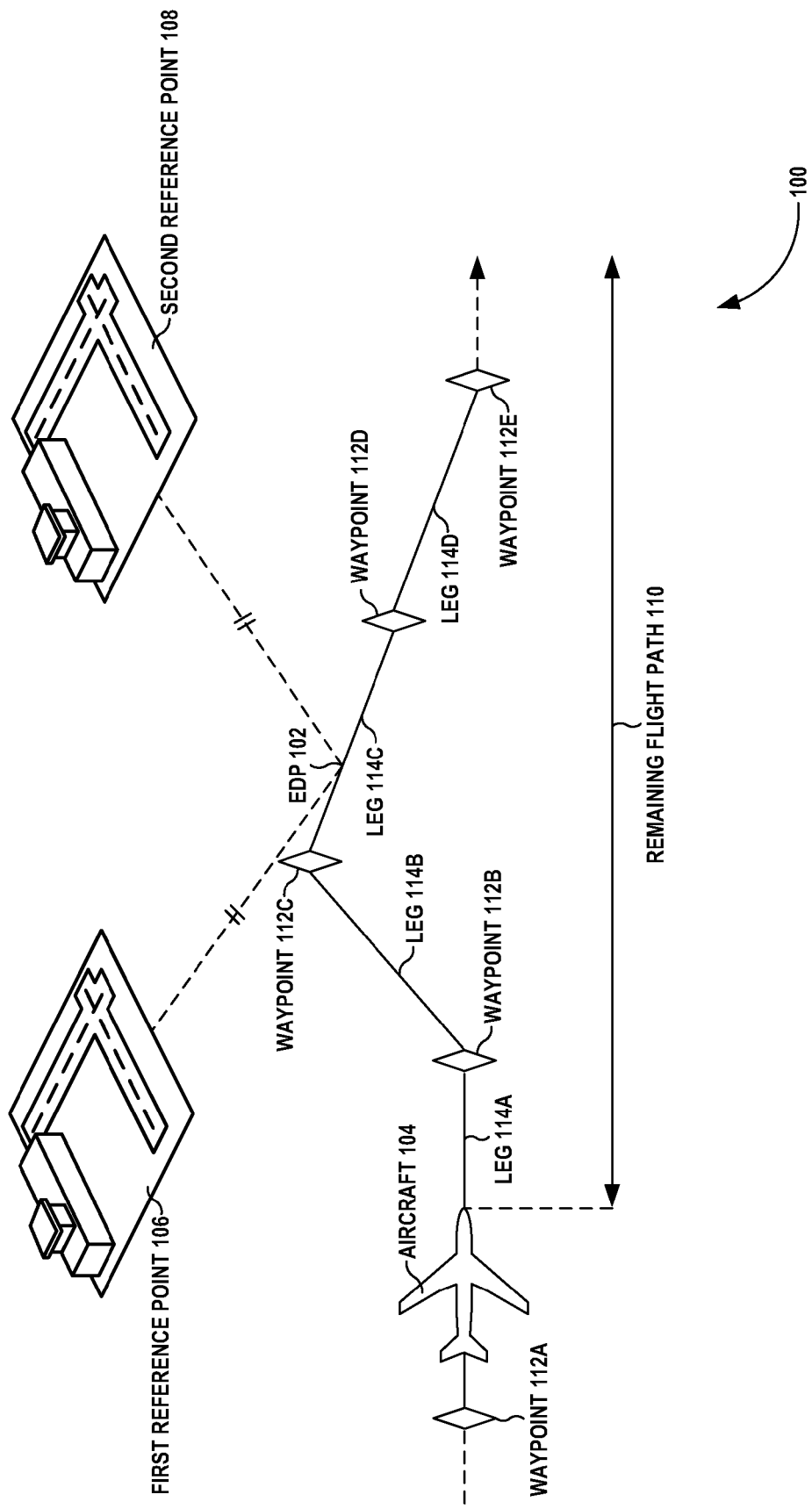
FIG. 1 illustrates an exemplary schematic representation illustrating generation of an EDP for an aircraft, according to an embodiment of the invention.

FIG. 1 illustrates an exemplary schematic representation 100 illustrating generation of an EDP 102 for an aircraft 104, according to an embodiment of the invention. In particular, FIG. 1 shows a flight plan serviced by a flight management system (FMS) of the aircraft 104. The flight plan includes a plurality of waypoints 112A-E and a plurality of legs 114A-D. The waypoints 112A-E may be a set of coordinates (e.g., latitudinal and longitudinal coordinates) in physical space. The plurality of legs 114A-D represents a flight path of the aircraft 104.

According to an embodiment of the present invention, a first reference point 106 and a second reference point 108 are received by the FMS of the aircraft 104 for landing the aircraft 104 upon the occurrence of an emergency. In one embodiment, the first reference point 106 and the second reference point 108 may be entered by a pilot of the aircraft 104 based on a current location of the aircraft 104. In an alternate embodiment, the first reference point 106 and the second reference point 108 may be automatically selected by the FMS based on the current location of the aircraft 104.

The first reference point 106 and the second reference point 108 may be a departure airport and an arrival airport for the aircraft 104 by default. Alternatively, each of the first reference point 106 and the second reference point 108 may be an airport (other than the departure airport and the arrival airport), an airdrome, an airstrip, a runway, a landing field, an airfield and the like which is proximal to the current location of the aircraft 104. In one embodiment, more than two reference points can also be received from the pilot or automatically selected based on the current location of the aircraft 104.

Further, a remaining flight path 110 of the aircraft 104 is determined based on the current location of the aircraft 104 and the flight plan. The EDP 102 is then generated by locating a point on the remaining flight path 110 (e.g., on any of the plurality of legs 114B-D) which is equidistant from the first reference point 106 and the second reference point 108.

Figure 2:
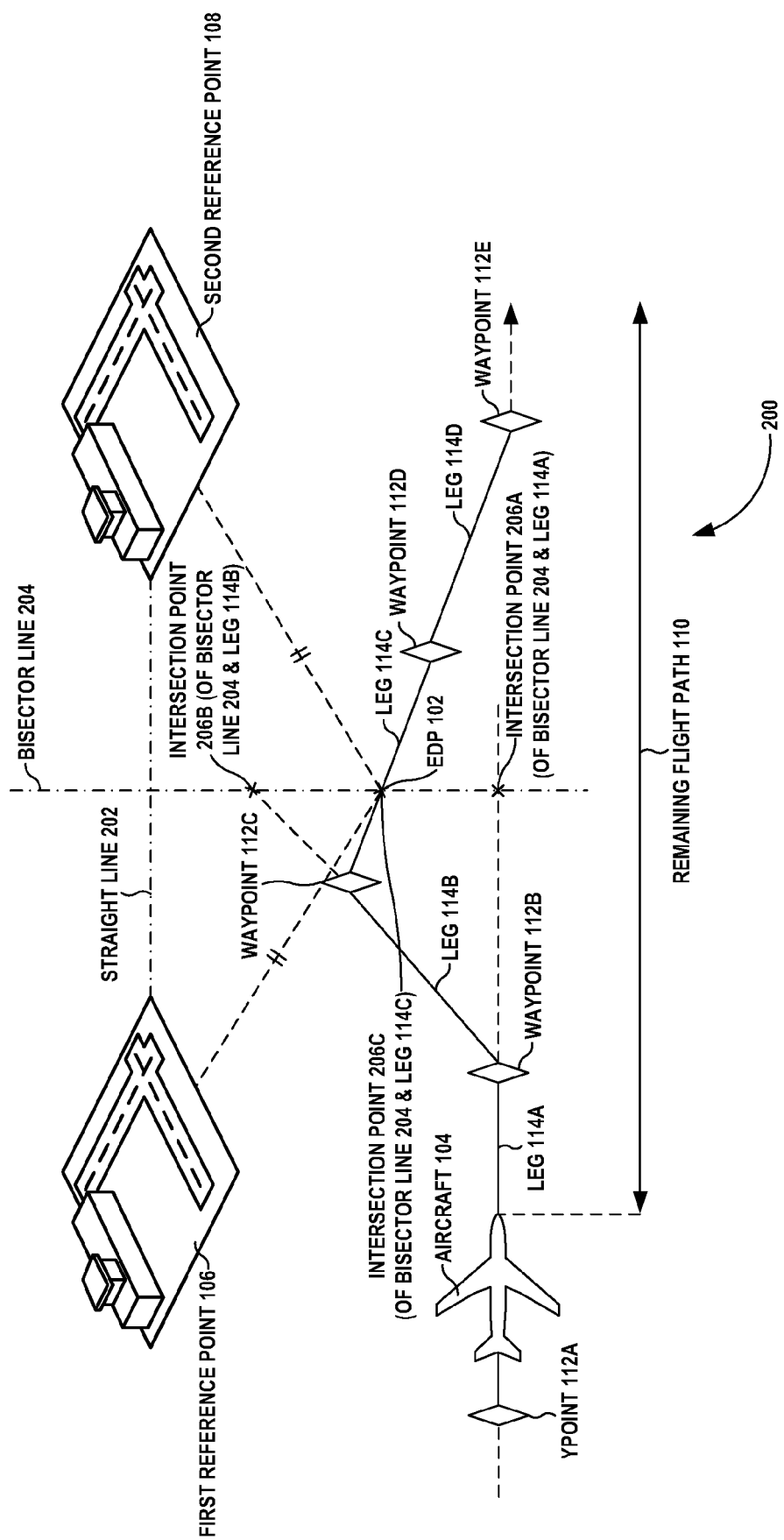
FIG. 2 illustrates an exemplary schematic representation illustrating computation of the EDP for the aircraft of FIG. 1 with respect to the remaining flight path, according to an embodiment of the invention.

FIG. 2 illustrates an exemplary schematic representation 200 illustrating computation of the EDP 102 for the aircraft 104 from FIG. 1 with respect to the remaining flight path 110, according to an embodiment of the invention. As discussed above, the EDP 102 is computed by locating a point on the remaining flight path 110 of the aircraft 104. For computing the EDP 102, a straight line 202 is formed between the first reference point 106 and the second reference point 108. The straight line 202 is formed using a first equation $Y_{ref}=M_{ref}X_{ref}+C_{ref}$ in Cartesian coordinates. The Cartesian coordinates include an X-axis and a Y-axis for defining a position of the aircraft 104. For example, the X-axis represents a longitudinal line at 0° and the Y-axis represents a latitudinal line at 0°. The slope ($M_{ref}$) of the straight line 202 is computed using the equation:

$$M_{ref} = \frac{Y_{ref2} - Y_{ref1}}{X_{ref2} - X_{ref1}},$$

where $X_{ref1}$ and $Y_{ref1}$ refer to longitude and latitude of the first reference point 106 and $X_{ref2}$ and $Y_{ref2}$ refer to longitude and latitude of the second reference point 108. Further, the intercept ($C_{ref}$) of a reference Y-axis for the straight line 202 is computed using $C_{ref}=Y_{ref2}-M_{ref}X_{ref2}$.

Then, a bisector line 204 is generated and extended perpendicular to the straight line 202. The bisector line 204 is generated using a second equation $Y_{perp}=M_{perp}X_{perp}+C_{perp}$ with $$M_{perp} = \frac{-1}{M_{ref}}$$

being a slope of the bisector line 204 and $$C_{perp} = \frac{Y_{ref1} + Y_{ref2}}{2} + \frac{1}{M_{ref}}\left(\frac{X_{ref1} + X_{ref2}}{2}\right)$$

being an intercept of the reference Y-axis.

Further, intersection points of the bisector line 204 with the plurality of legs 114A-D in the remaining flight path 110 are located. In one embodiment, each of the plurality of legs 114A-D is based on a third equation $Y_{wpt}=M_{wpt}X_{wpt}+C_{wpt}$ in Cartesian coordinates with $$M_{wpt} = \frac{Y_{wpt2} - Y_{wpt1}}{X_{wpt2} - X_{wpt1}}$$

being the slope of the each of the plurality of legs 114A-D and $C_{wpt}=Y_{wpt2}-M_{wpt}X_{wpt2}$ being the intercept of the reference Y-axis. In the above equations for $M_{wpt}$ and $C_{wpt}$, $X_{wpt1}$ and $Y_{wpt1}$ refers to longitudinal and latitudinal coordinates of a first or start waypoint of each of the legs 114A-D and $X_{wpt2}$ and $Y_{wpt2}$ refers to longitudinal and latitudinal coordinates of a second or end waypoint of each of the legs 114A-D.

As illustrated, the bisector line 204 intersects the leg 114A at an intersection point 206A. Also, the bisector line 204 intersects the leg 114B at an intersection point 206B. Similarly, the bisector line 204 intersects the leg 114C at an intersection point 206C. Although it is not illustrated in FIG. 2, there can be more intersection points as there are more legs in the remaining flight path 110. Based on the intersection points 206A-C, the EDP 102 for the aircraft 104 is computed. In one embodiment, the EDP 102 for the aircraft 104 is computed by comparing a length of each of the plurality of legs 114A-C with a distance between a start point of each of the plurality of legs 114A-C and the corresponding intersection point. According to an embodiment of the present invention, an intersection point of a leg and the bisector line 204 is determined as the EDP 102 if the length of the leg is greater than the distance between the start point of the leg and the intersection point.

In the example embodiment illustrated in FIG. 2, the length of the leg 114B is compared with the distance between the start point of the leg 114B and the intersection point 206B. It can be seen from FIG. 2 that, the length of the leg 114B is less than the distance between the start point of the leg 114B and the intersection point 206B. Thus, the intersection point 206B is determined to be not the EDP 102. Further, the length of the leg 114C is compared with the distance between the start of the leg 114C and the intersection point 206C. It can be seen from FIG. 2 that, the length of the leg 114C is greater than the distance between the start point of the leg 114C and the intersection point 206C. Hence, the intersection point 206C is determined as the EDP 102.

Figure 3:
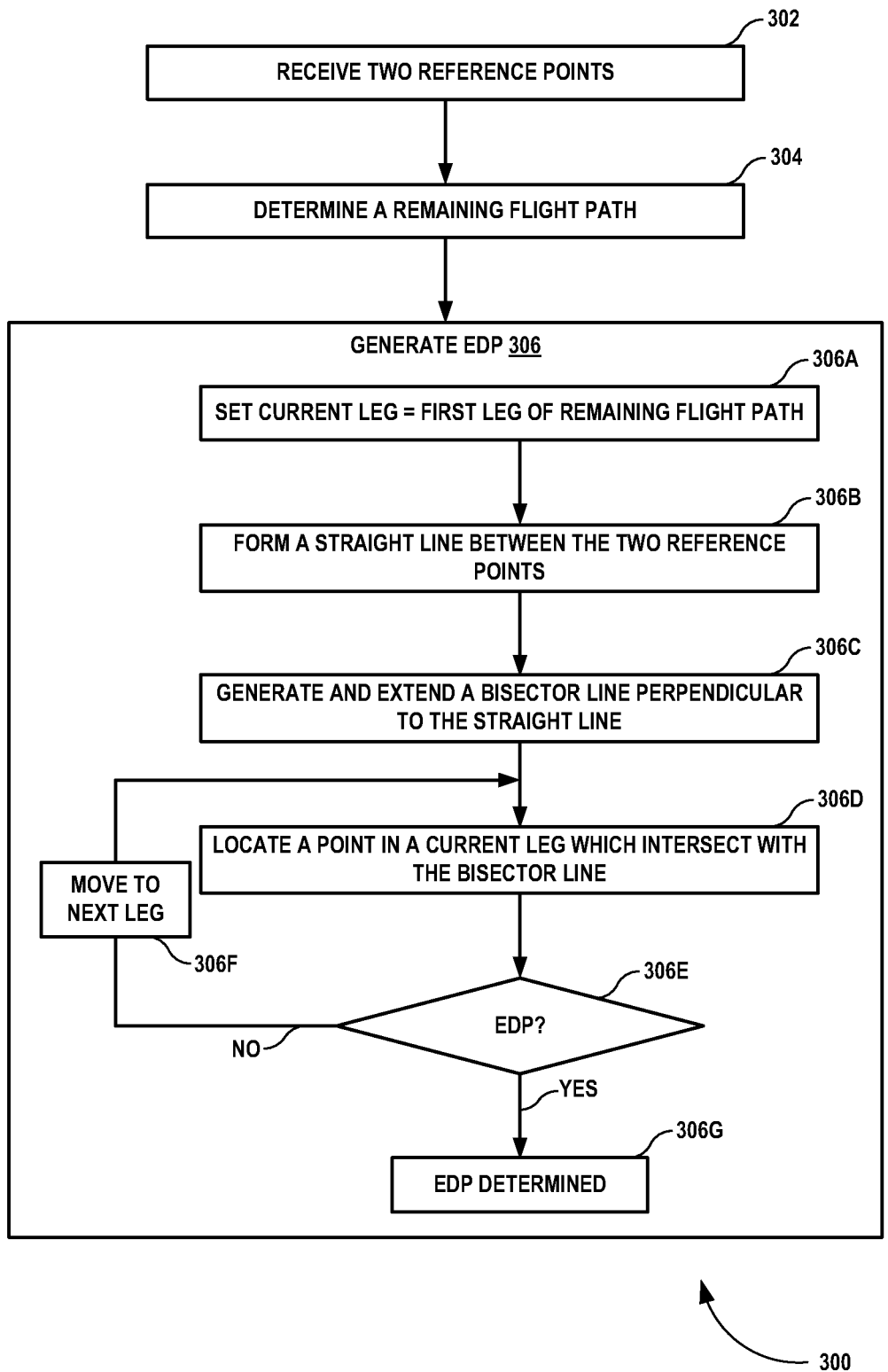
FIG. 3 illustrates a process flowchart of an exemplary method of a flight management system (FMS) of an aircraft for dynamically computing an EDP for the aircraft, according to an embodiment of the invention.

FIG. 3 illustrates a process flowchart of an exemplary method 300 of an FMS of an aircraft for dynamically computing an EDP for the aircraft, according to an embodiment of the invention. In step 302, two reference points for landing the aircraft is received. For example, the two reference points may be received from a pilot of the aircraft or may be automatically chosen, upon an occurrence of an emergency. In step 304, a remaining flight path for the aircraft is determined. The determination may be based on a current location of the aircraft and a flight plan serviced by the FMS of the aircraft.

The method 300 then performs step 306 in which the EDP for the aircraft is computed. In one embodiment, the EDP is computed by locating a point in the remaining flight path which is equidistant from the two reference points. The remaining flight path includes a plurality of way points and a plurality of legs. Moreover, the steps involved in computing the EDP are described in steps 306A through 306G. In step 306A, a first leg of the remaining flight path is set as a current leg. In step 306B, a straight line is formed between the two reference points. In step 306C, a bisector line is generated and extended perpendicular to the straight line.

In step 306D, a point in the current leg which intersects the bisector line is located. In step 306E, it is determined whether the intersection point is the EDP. The step is carried out by comparing the length of the current leg with the distance between the start point of the current leg and the intersection point. If the length of the current leg is greater than the distance between the start point of the current leg and the intersection point, then the intersection point is determined as the EDP in step 306G.

If the length of the current leg is less than the distance between the start point of the current leg and the intersection point, then the next leg in the remaining flight path is selected as the current leg in step 306F. Further, the step 306D is repeated to locate a point in the next leg which intersects with the bisector line. It is appreciated that steps 306E, 306F and 306G may be repeated until the EDP is determined. It is also appreciated that the steps 306A-G may use mathematical formulas described in FIG. 2 to obtain the EDP.

Figure 4:
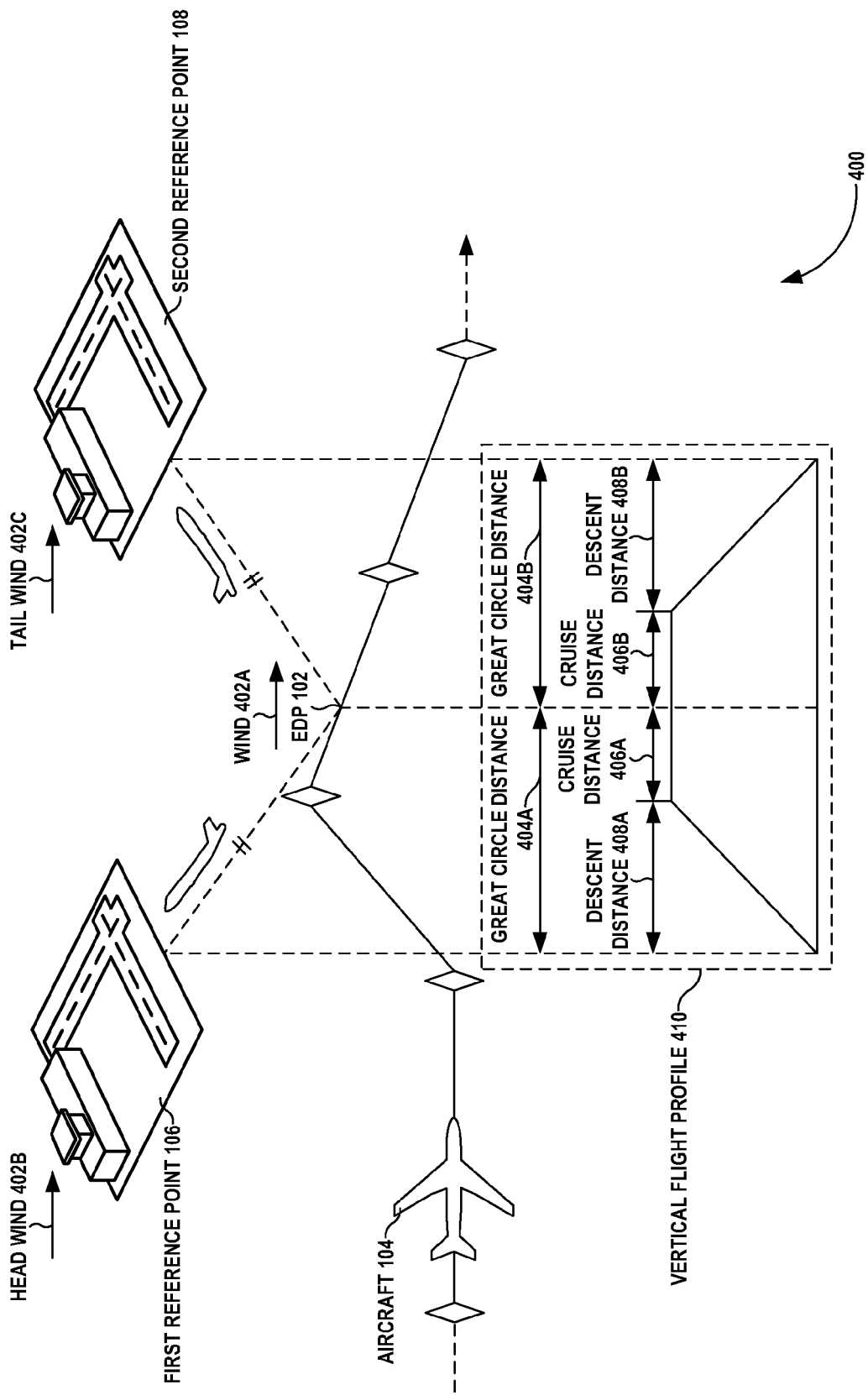
FIG. 4 illustrates an exemplary schematic representation illustrating computation of flight time from the EDP to each reference point, according to an embodiment of the invention.

FIG. 4 illustrates an exemplary schematic representation 400 illustrating computation of flight time from the EDP 102 to each reference point (e.g., the first reference point 106 and the second reference point 108), according to an embodiment of the invention. In one embodiment, the flight time from the EDP 102 to the first reference point 106 and the second reference point 108 is calculated by the FMS for emergency landing of the aircraft 104. In this embodiment, the flight time of the aircraft 104 from the EDP 102 to the first reference point 106 and the second reference point 108 is calculated based on factors effecting the flight time of the aircraft 104. Exemplary factors affecting the flight time of the aircraft 104 may include a wind velocity at the first reference point 106 and the second reference point 108 (e.g., determined based on a head wind 402B and a tail wind 402C), characteristics of the aircraft 104 (e.g., a type, a performance level, a condition, etc. of the aircraft 104) and/or a distance from the EDP 102 to the first reference point 106 and the second reference point 108.

As illustrated, the flight time of the aircraft 104 from the EDP 102 to the first reference point 106 and the second reference point 108 is calculated based on a default flight profile (e.g., a vertical flight profile 410) flying a great circle distance 404A or 404B. The great circle distance 404A or 404B is the shortest distances between the EDP 102 and the first reference point 106 or the second reference point 108, respectively. As can be seen from FIG. 4, the great circle distance 404A is a sum of a cruise distance 406A and a descent distance 408A. Also, the great circle distance 404B is a sum of a cruise distance 406B and a descent distance 408B.

According to an embodiment of the present invention, the flight time from the EDP 102 to the first reference point 106 is a sum of a cruise time for the cruise distance 406A and a descent time for the descent distance 408A. The cruise time for the cruise distance 406A is calculated as:

cruise time=cruise distance/ground speed, where, the ground speed is a sum of a true air speed (TAS) and a wind velocity at a cruise altitude. In one exemplary implementation, the cruise time is calculated based on an assumption that an expected cruise flight of the aircraft 104 for the cruise distance 406A is carried out at an optimum speed (e.g., in mach) based on a predicted gross weight of the aircraft 104 and an effect of wind 402A at the EDP 102. The TAS is calculated by converting the optimum speed to a true air speed at cruise conditions.

The descent time for the descent distance 408A is calculated by taking into account allowances stored in a performance database of the aircraft 104. In one example embodiment, the descent time is a sum of allowances at different altitudes that are stored in the performance database for a particular descent distance. It is appreciated that the allowances refer to aircraft performance data, such as time, distance, fuel etc. associated with the flight of the aircraft 104. It is further appreciated that the allowances may be stored in tables, where the tables are used to interpolate respective time, distance, fuel, etc. as functions of the gross weight and altitude of the aircraft 104. These tables may also be based on simplified algorithms for a default profile of the aircraft 104 in the case of an emergency. For example, the allowances in the tables may be used to account for engine failure of the aircraft 104. In case of the engine failure, the corresponding tables are used to reflect its effect on the descent time taken by the aircraft 104. The descent time for the descent distance 408A is also calculated based on a wind velocity (e.g., the head wind 402B) at the first reference point 106.

Similarly, the flight time from the EDP 102 to the second reference point 108 is a sum of a cruise time for the cruise distance 406B and a descent time for the descent distance 408B. The cruise time for the cruise distance 406B is calculated as:

cruise time=cruise distance/ground speed, where, the ground speed is a sum of a true air speed (TAS) and a wind velocity at a cruise altitude. In one exemplary implementation, the cruise time is calculated based on an assumption that an expected cruise flight of the aircraft 104 for the cruise distance 406B is carried out at an optimum speed based on a predicted gross weight of the aircraft 104 and an effect of wind 402A at the EDP 102. The TAS is calculated by converting the optimum speed to a true air speed at cruise conditions.

The descent time for the descent distance 408B is calculated by taking into account allowances stored in a performance database of the aircraft 104. In one example embodiment, the descent time is a sum of allowances at different altitudes that are stored in the performance database for a particular descent distance. The descent time for the descent distance 408B is also calculated based on a wind velocity (e.g., the tail wind 402C) at the second reference point 108. Thus, in the manner described above, the FMS of the aircraft 104 computes the flight time of the aircraft 104 from the EDP 102 to the first reference point 106 and to the second reference point 108.

Figure 5:
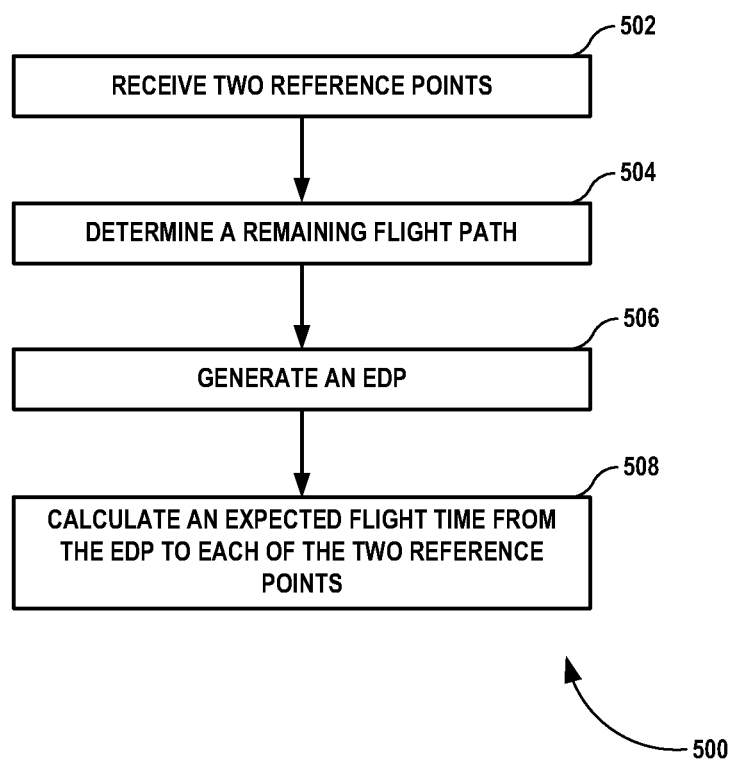
FIG. 5 illustrates a process flowchart of an exemplary method of a FMS of an aircraft for computing flight time from the EDP to each reference point, according to an embodiment of the invention.

FIG. 5 illustrates a process flowchart of an exemplary method 500 of an FMS of an aircraft for computing flight time from an EDP to each reference point, according to an embodiment of the invention. In step 502, two reference points are received from a pilot of the aircraft for landing the aircraft upon an occurrence of an emergency. In step 504, a remaining flight path is determined based on a current location of the aircraft and a flight plan serviced by the FMS. In step 506, the EDP for the aircraft is generated by locating a point in the remaining flight path which is equidistant from the two reference points.

In step 508, an expected flight time of the aircraft from the EDP to each of the two reference points is calculated based on a plurality of factors affecting the flight time of the aircraft. For example, the plurality of factors affecting the flight time includes a wind velocity, characteristics of the aircraft, and/or a distance from the EDP to the each one of the two reference points. Further, the expected flight time of the aircraft is calculated based on a default flight profile flying a great circle distance. The great circle distance includes a cruise distance and a descent distance of the aircraft from the EDP to the each one of the two reference points.

In one exemplary implementation, the flight time from the EDP to the each of the two reference points is a sum of a descent time for the descent distance and a cruise time for the cruise distance. The descent time for the descent distance is calculated by taking into account allowances stored in a performance database of the aircraft. Also, the descent time is calculated based on a wind velocity at the each of the two reference points. The cruise time for the cruise distance is calculated based on the formula: cruise time=cruise distance/ground speed, where the ground speed is a sum of a true air speed (TAS) and a wind velocity at a cruise altitude. It can be noted that, the cruise time is calculated based on an assumption that an expected cruise flight of the aircraft for the cruise distance is carried out at an optimum mach based on a predicted gross weight of the aircraft and an effect of wind at the EDP.

Figure 6:
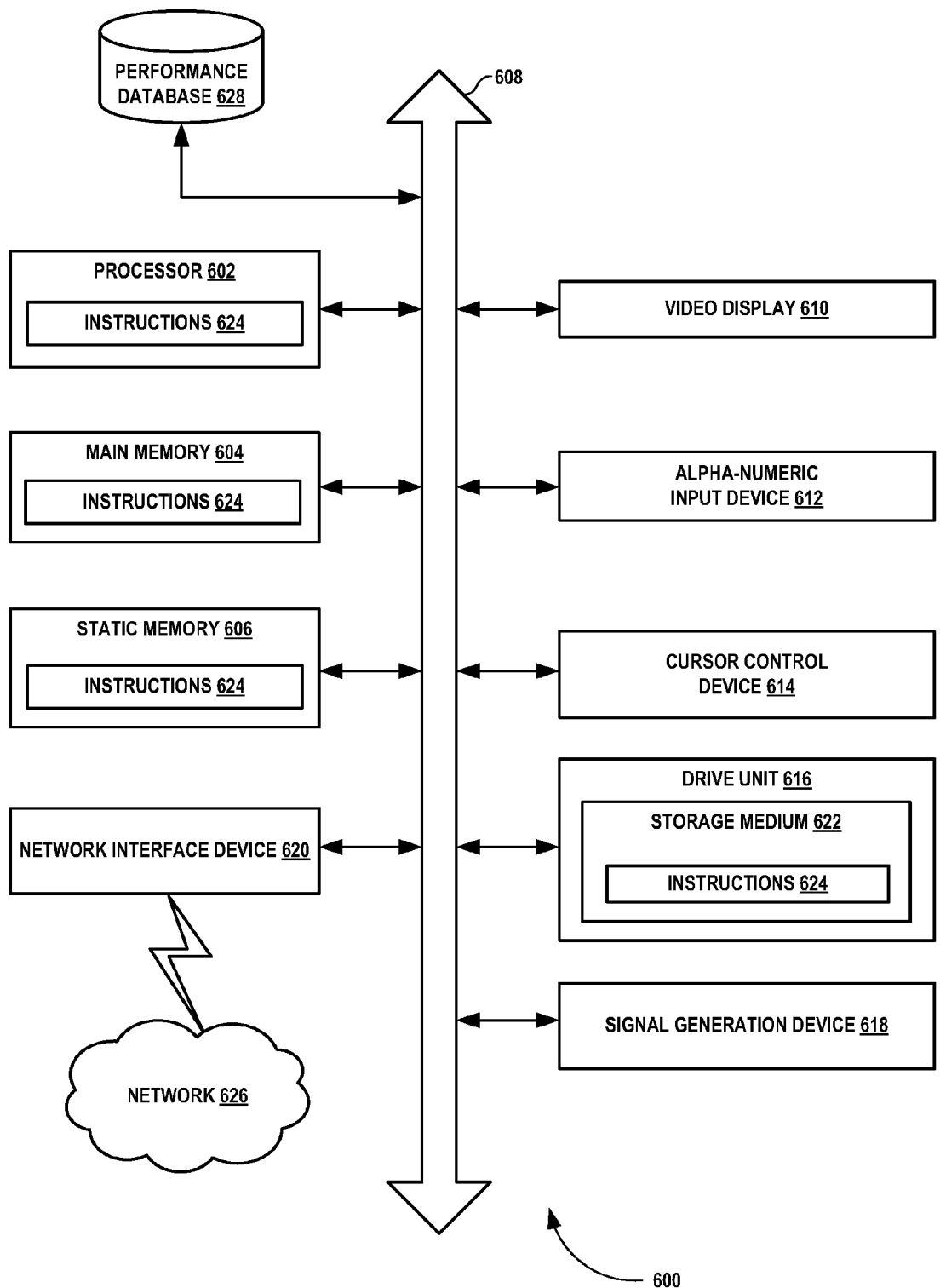
FIG. 6 illustrates a diagrammatic system view of a data processing system of the FMS in which any of the embodiments disclosed herein may be performed, according to an embodiment of the invention.

FIG. 6 illustrates a diagrammatic system view 600 of a data processing system of the FMS in which any of the embodiments disclosed herein may be performed, according to an embodiment of the invention. Particularly, the diagrammatic system view 600 of FIG. 6 illustrates a processor 602, a main memory 604, a static memory 606, a bus 608, a video display 610, an alpha-numeric input device 612, a cursor control device 614, a drive unit 616, a signal generation device 618, a network interface device 620, a storage medium 622, instructions 624, a network 626 and a performance database 628.

The diagrammatic system view 600 may indicate a data processing system of the FMS of the aircraft (e.g., the aircraft 104 of FIGS. 1 and 2) in which one or more operations disclosed herein are performed. The processor 602 may be a microprocessor, a state machine, an application specific integrated circuit, a field programmable gate array, etc. The main memory 604 may be a dynamic random access memory and/or a primary memory of the FMS. The static memory 606 may be a hard drive, a flash drive, and/or other memory information associated with the data processing system.

The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse. The drive unit 616 may be a hard drive, a storage system, and/or other longer term storage subsystem.

The signal generation device 618 may be a BIOS and/or a functional operating system of the data processing system. The network interface device 620 may perform interface functions (e.g., code conversion, protocol conversion, and/or buffering) required for communications to and from the network 626 between a number of independent devices (e.g., of varying protocols). The storage medium 622 may provide instructions on which any of the methods disclosed herein may be performed. The instructions 624 may provide source code and/or data code to the processor 602 to enable any one or more operations disclosed herein. The performance database 628 may be a database coupled to the processor 602 and is configured to store data associated with the aircraft (e.g., allowances used to calculate a descent time of the aircraft for the emergency landing).

In one embodiment, a storage medium 622 has instructions 624, that when executed by a computing platform of the FMS, result in execution of a method for computing flight time from the EDP to a reference point for an emergency landing of the EDP for the aircraft. The method includes receiving at least two reference points (e.g., the first reference point 106 and a second reference point 108) for landing the aircraft upon an occurrence of an emergency. The method also includes determining a remaining flight path for the aircraft based on a current location of the aircraft and a flight plan serviced by the FMS of the aircraft.

Further, the method includes generating the EDP for the aircraft by locating a point on the remaining flight path which is equidistant from the at least two reference points. Then, the method includes calculating an expected flight time of the aircraft taken from the EDP to each of the at least two reference points based on a plurality of factors affecting the flight time of the aircraft. The plurality of factors affecting the flight time includes a wind velocity, characteristics of the aircraft, and/or a distance from the EDP to the each one of the at least two reference points.

The storage medium may also have instructions to calculate the expected flight time of the aircraft from the EDP to the each one of the at least two reference points based on a default flight profile flying a great circle distance. The great circle distance includes a cruise distance and a descent distance of the aircraft from the EDP to the each one of the at least two reference points. Further, the storage medium may have instructions to calculate a descent time for the descent distance by taking into account allowances stored in a performance database of the aircraft. The descent time is further based on a wind velocity at the each of the at least two reference points.

Furthermore, the storage medium may have instructions to calculate a cruise time for the cruise distance based on the formula: cruise time=cruise distance/ground speed, wherein the ground speed is a sum of a true air speed (TAS) and a wind velocity at a cruise altitude. In one exemplary implementation, the cruise time is calculated based on an assumption that an expected cruise flight of the aircraft for the cruise distance is carried out at an optimum mach based on a predicted gross weight of the aircraft and an effect of wind at the EDP.

In another embodiment, the data processing system of the FMS of the aircraft for computing flight time from the EDP to the reference point for an emergency landing of the aircraft includes the main memory 604 coupled to the processor 602 which has instructions stored therein, that when executed by the processor 602 causes the processor 602 to perform the method described above.

In addition, it will be appreciated that the various operations, processes, and methods disclosed herein may be embodied in a machine-readable medium and/or a machine accessible medium compatible with a data processing system, and may be performed in any order (e.g., including using means for achieving the various operations). Accordingly, the specification and drawings are to be regarded in an illustrative rather than a restrictive sense.

What is claimed is:

1. A method of a flight management system (FMS) of an aircraft for computing flight time from an equi-distance point (EDP) to a reference point for an emergency landing of the aircraft, comprising:

receiving, by a processor, at least two reference points for landing the aircraft upon an occurrence of an emergency;

determining, by the processor, a remaining flight path for the aircraft based on a current location of the aircraft and a flight plan serviced by the flight management system;

generating, by the processor, the equi-distance point for the aircraft by locating a point in the remaining flight path which is equidistant from the at least two reference points; and calculating, by the processor, an expected flight time of the aircraft from the equi-distance point to each of the at least two reference points based on a plurality of factors affecting the flight time of the aircraft.

2. The method of claim 1, wherein the at least two reference points are received from a pilot of the aircraft.

3. The method of claim 1, wherein the at least two reference points comprise a departure airport and an arrival airport for the aircraft by default.

4. The method of claim 1, wherein the plurality of factors affecting the flight time comprises at least one of a wind velocity, characteristics of the aircraft, and a distance from the equi-distance point to the each one of the at least two reference points.

5. The method of claim 1, wherein the calculating the expected flight time of the aircraft from the equi-distance point to the each one of the at least two reference points is performed based on a default flight profile encompassing a great circle distance.

6. The method of claim 5, wherein the great circle distance comprises a cruise distance and a descent distance of the aircraft from the equi-distance point to the each one of the at least two reference points.

7. The method of claim 6, further comprising calculating a descent time for the descent distance based on allowances stored in a performance database of the aircraft.

8. The method of claim 7, wherein the descent time is further based on a wind velocity at the each of the at least two reference points.

9. The method of claim 6, further comprising calculating a cruise time for the cruise distance based on: the cruise time=cruise distance/ground speed, wherein the ground speed is a sum of a true air speed (TAS) and a wind velocity at a cruise altitude.

10. The method of claim 9, wherein the calculating the cruise time is based on an assumption that an expected cruise flight of the aircraft for the cruise distance is carried out at an optimum mach based on a predicted gross weight of the aircraft and an effect of wind at the equi-distance point.

11. An article, comprising:
a non-transitory computer readable storage medium having instructions, that when executed by a computing platform of a flight management system (FMS) of an aircraft, result in execution of a method for computing flight time from an equi-distance point (EDP) to a reference point for an emergency landing of the aircraft, comprising:
receiving at least two reference points for landing the aircraft upon an occurrence of an emergency;
determining a remaining flight path for the aircraft based on a current location of the aircraft and a flight plan serviced by the flight management system;
generating the equi-distance point for the aircraft by locating a point in the remaining flight path which is equidistant from the at least two reference points; and
calculating an expected flight time of the aircraft from the equi-distance point to each of the at least two reference points based on a plurality of factors affecting the flight time of the aircraft.

12. The article of claim 11, wherein the plurality of factors affecting the flight time comprises at least one of a wind velocity, characteristics of the aircraft, and a distance from the equi-distance point to the each one of the at least two reference points.

13. The article of claim 11, wherein the calculating the expected flight time of the aircraft from the equi-distance point to the each one of the at least two reference points is performed based on a default flight profile flying a great circle distance.

14. The article of claim 13, wherein the great circle distance comprises a cruise distance and a descent distance of the aircraft from the equi-distance point to the each one of the at least two reference points.

15. The article of claim 14, further comprising calculating a descent time for the descent distance based on allowances stored in a performance database of the aircraft.

16. The article of claim 15, wherein the descent time is further based on a wind velocity at the each of the at least two reference points.

17. The article of claim 14, further comprising calculating a cruise time for the cruise distance based on: the cruise time=cruise distance/ground speed, wherein the ground speed is a sum of a true air speed (TAS) and a wind velocity at a cruise altitude.

18. The article of claim 17, wherein the calculating the cruise time is based on an assumption that an expected cruise flight of the aircraft for the cruise distance is carried out at an optimum mach based on a predicted gross weight of the aircraft and an effect of wind at the equi-distance point.

19. A system of a flight management system (FMS) of an aircraft for computing flight time from an equi-distance point (EDP) to a reference point for an emergency landing of the aircraft, comprising:
a processor; and
a memory coupled to the processor and configured for storing a set of instructions, when executed by the processor, causes the processor to perform a method comprising:
receiving at least two reference points for landing the aircraft upon an occurrence of an emergency;
determining a remaining flight path for the aircraft based on a current location of the aircraft and a flight plan serviced by the flight management system;
generating the equi-distance point for the aircraft by locating a point in the remaining flight path which is equidistant from the at least two reference points; and
calculating an expected flight time of the aircraft from the equi-distance point to each of the at least two reference points based on a plurality of factors affecting the flight time of the aircraft.

20. The system of claim 19, further comprising a performance database coupled to the processor for storing allowances used to calculate a descent time of the aircraft for the emergency landing.

* * * * *